ALMON WARNER.

Improvement in Hub for Carriage Wheels.

No. 4,642. Reissued Nov. 21, 1871.

Witnesses.

E. Pierrepont

Jonathan Ingersoll

Almon Warner

Inventor.

AM. PHOTO-LITHOGRAPHIC CO. N.Y. (OSBORNE'S PROCESS.)

UNITED STATES PATENT OFFICE.

ALMON WARNER, OF HAMPDEN, ASSIGNOR, BY MESNE ASSIGNMENTS, TO ELIHU HALL & CO., OF WALLINGFORD, CONNECTICUT.

IMPROVEMENT IN HUBS FOR CARRIAGE-WHEELS.

Specification forming part of Letters Patent No. 61,900, dated February 5, 1867; reissue No. 4,642, dated November 21, 1871.

*To all whom it may concern:*

Be it known that I, ALMON WARNER, of Hampden, in the county of New Haven and State of Connecticut, have invented a certain new and useful Improvement in Hubs for Carriage-Wheels; and I do hereby declare that the following is a full and correct description thereof, reference being had to the accompanying drawing forming a part of this specification and to the letters of reference thereon.

Figure 1:
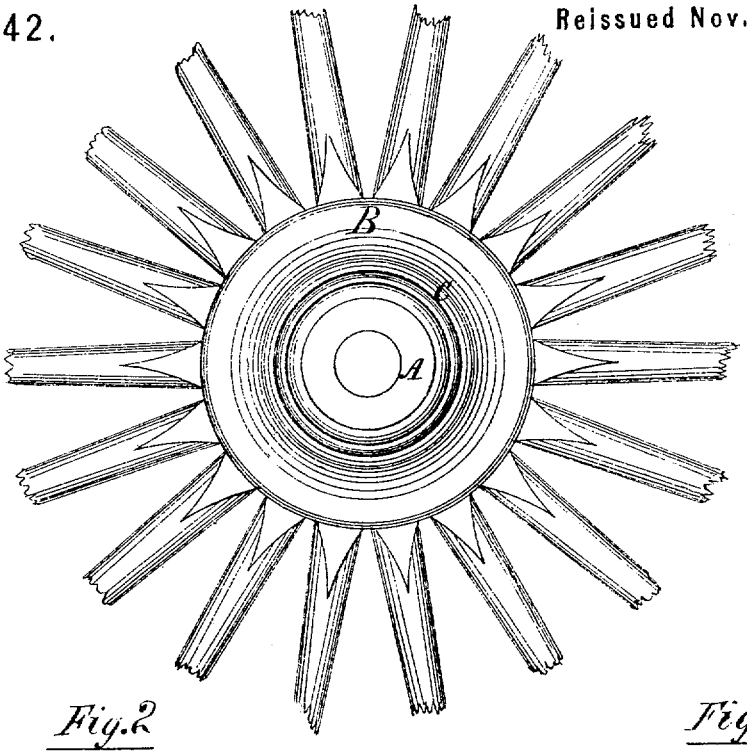
Figure 2:
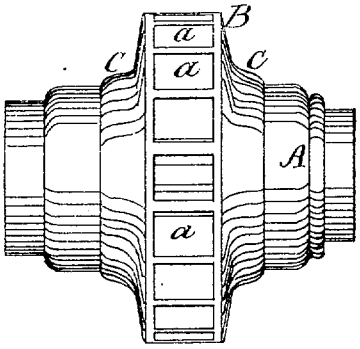
Figure 3:
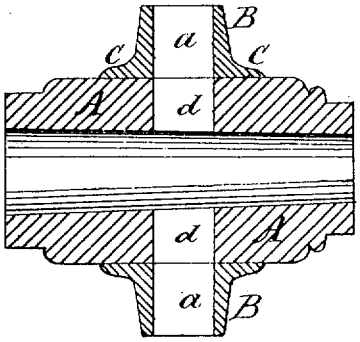
Figure 4:
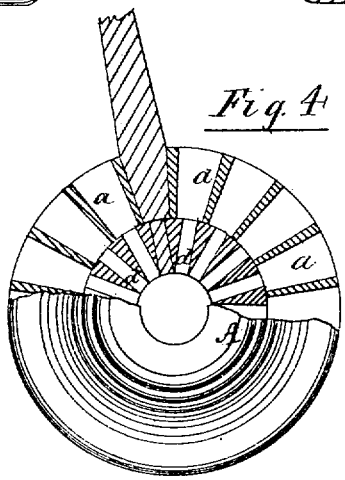

Figure 1 is a side elevation of the hub with spokes. Fig. 2 is a front elevation of the hub; Fig. 3, a longitudinal central section; and Fig. 4, a partial transverse section.

This invention relates to an improvement in the hub of carriage-wheels; the object being to more perfectly secure the spokes in the hub; and it consists in the construction of a ring or metal center provided with mortises to receive the spokes, and formed with flanges to bear upon the surface of a wooden hub which passes through the center of the metal ring, and is pro- vided with mortises to receive the tenons of spokes.

To enable others skilled in the art to construct and use my improvement, I will proceed to describe the same as illustrated by the accompanying drawing.

A is the wooden hub, in which the axle-box is fitted in the usual manner. B is a ring of metal, in which are formed mortises *a* to receive the lower ends of the spokes, and corresponding mortises, *d*, are formed in the wood to receive the tenons of the spokes. The ring B is made with flanges C C upon either side, to form a strong bearing upon the wooden hub. The metal portion of the hub is driven onto the wood, as seen in Figs. 2 and 3, and the mortises made in the wood before or after, as preferred. The spokes being driven into the mortises bear on all sides upon metal, and are thus held in the firmest manner.

By use of my improvement a very light hub is capable of firmly supporting a greater number of spokes than if made entirely of wood.

Having thus described my invention, what I claim, and desire to secure by Letters Patent, is—

The combination of the ring B, formed with its mortises *a* and flanges *c c*, with a mortised wooden hub, A, substantially as described.

ALMON WARNER.

Witnesses:

E. PURRINGTON,

JONATHAN INGERSOLL.

(31)